US007976658B2

(12) United States Patent
Zaretsky et al.

(10) Patent No.: US 7,976,658 B2
(45) Date of Patent: Jul. 12, 2011

(54) METHOD OF MANUFACTURING A LOW COST INTERMEDIATE TRANSFER MEMBER

(75) Inventors: Mark C. Zaretsky, Rochester, NY (US); Craig M. Cody, Scottsville, NY (US); Thomas N. Tombs, Rochester, NY (US); Andrew P. Kittleson, Rochester, NY (US); M. Cristina B. Dejesus, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1321 days.

(21) Appl. No.: 11/503,595

(22) Filed: Aug. 14, 2006

(65) Prior Publication Data

US 2008/0035265 A1 Feb. 14, 2008

(51) Int. Cl.
*B32B 37/00* (2006.01)

(52) U.S. Cl. .... 156/73.4; 156/73.1; 156/157; 156/304.3

(58) Field of Classification Search ................. 156/73.1, 156/73.4, 157, 304.1, 304.3, 502, 505, 509
See application file for complete search history.

(56) References Cited

U.S. PATENT DOCUMENTS

| | | | | |
|---|---|---|---|---|
| 3,938,928 | A * | 2/1976 | Andrews | 425/430 |
| 5,084,735 | A | 1/1992 | Rimai et al. | |
| 5,298,956 | A | 3/1994 | Mammino et al. | |
| 5,370,961 | A | 12/1994 | Zaretsky et al. | |
| 5,409,557 | A | 4/1995 | Mammino et al. | |
| 5,761,595 | A | 6/1998 | Tarnawskyj et al. | |
| 5,968,656 | A | 10/1999 | Ezenylimba et al. | |
| 5,985,419 | A * | 11/1999 | Schlueter et al. | 428/195.1 |
| 6,016,415 | A | 1/2000 | Herrick et al. | |
| 6,217,964 | B1 * | 4/2001 | Ndebi et al. | 428/36.91 |
| 6,245,402 | B1 | 6/2001 | Schlueter, Jr. et al. | |
| 6,377,772 | B1 | 4/2002 | Chowdry et al. | |
| 6,457,392 | B2 | 10/2002 | Schlueter, Jr. et al. | |
| 6,615,721 | B1 * | 9/2003 | Vrotacoe et al. | 101/375 |
| 2003/0144103 | A1 * | 7/2003 | Battat et al. | 474/254 |
| 2005/0232662 | A1 | 10/2005 | Mishra et al. | |
| 2006/0002746 | A1 | 1/2006 | Darcy, III et al. | |

FOREIGN PATENT DOCUMENTS

| | | |
|---|---|---|
| EP | 0 899 626 A1 | 3/1999 |
| EP | 0 929 011 A1 | 7/1999 |
| JP | 2001289823 | 10/2001 |
| JP | 2004163503 | 11/2002 |
| JP | 2005234445 | 9/2005 |

* cited by examiner

*Primary Examiner* — James Sells
(74) *Attorney, Agent, or Firm* — Carl F. Ruoff; Andrew J. Anderson

(57) ABSTRACT

The present invention is a process for making an intermediate transfer member. The process includes forming an endless belt by seaming two ends of a substrate material to form a seam. A smoothing layer is applied on top of the endless belt using a rotary cast process wherein said intermediate transfer member has a continuous seamless top surface. In a preferred embodiment the endless belt is formed by adhering at least two layers of a substrate to form a belt having an inner and outer seam.

23 Claims, 5 Drawing Sheets

METHOD OF MANUFACTURING A LOW COST INTERMEDIATE TRANSFER MEMBER

CROSS-REFERENCE TO RELATED APPLICATIONS

This application relates to commonly assigned Publication Numbers 2008/0038566, 2008/0051275, and 2008/0038025, filed simultaneously herewith and hereby incorporated by reference for all that it discloses.

FIELD OF THE INVENTION

The present invention relates to field of printing and copying. More particularly, it relates to a method of manufacture of intermediate transfer members that allows the use of low cost materials.

BACKGROUND OF INVENTION

Intermediate transfer members are well known and are widely used in electrostatographic imaging machines. A seamless intermediate transfer member (ITM) is desirable because it results in enhanced machine productivity for a wide variety of paper formats. Furthermore, a seamed ITM requires hardware for seam detection and increases the difficulty of cleaning the ITM. However, the cost associated with manufacturing a seamless ITM is high, especially for large circumference members.

The advantages of intermediate transfer members with more than one layer are discussed in the published literature. Multilayer ITMs can improve the quality of imaging because different layers can be designed to optimize specific functions of the imaging process. For example, a top layer may be optimized for toner release while the substrate layer may be optimized for its mechanical and electrical properties. An additional layer between the top layer and the substrate may be compliant so as to reduce image artifacts and improve transfer to certain paper types that are rough or textured. The use of compliant layers and release layers to improve transfer are described in U.S. Pat. Nos. 5,084,735 and 5,370,961. Also disclosed is the mold cast system used to produce a multilayer ITM. In order to meet image quality requirements of a typical electrostatographic machine, the ITM often has tight mechanical tolerances on features such as thickness, run-out and/or roughness, so as to minimize variations in machine operation such as overdrive and nip widths. In addition, the surface of the ITM must have low roughness. The grinding operation needed to make a multilayer ITM with the specified mechanical tolerances is a lengthy manufacturing step adding significant cost and time.

Mammino et al., in U.S. Pat. Nos. 5,298,956 and 5,409,557 disclose a process for manufacturing an intermediate transfer member having a reinforcing member embedded with filler material and electrical property regulating material. The reinforcing member described is composed of metal, synthetic material or fibrous material. The intermediate transfer member described has a thickness between 2 and 7 thousandths of an inch (0.05 to 0.175 mm).

U.S. Pat. No. 5,761,595 mentions the use of a multiple layer, carbon filled transfer component for improved transfer but makes no claim of imaging or transferring toner on top of the seam.

U.S. Pat. No. 6,457,392 refers to the method of making a seamless transfer belt using a puzzle cut punch and die system. The difficulties in manufacturing such a belt and the performance of such a belt are described in US Patent Publication 2006/0002746(A1).

Very long sheets of plastic or metal can be manufactured inexpensively in roll form using a continuous, high speed process. Therefore, the cost of a seamed substrate utilizing sheets cut from such a roll may be considerably less than the cost of manufacturing a seamless substrate (typically manufactured one piece at a time). For the reasons described above there exists a need for a low cost method to manufacture ITMs having a seamed substrate that can be used in electrostatographic machines where the seam area can be imaged upon without causing imaging artifacts or other difficulties.

One object of the present invention is to provide a process or manufacturing method to produce an intermediate transfer member that minimizes costly finishing steps such as grinding and conditioning. Another object of this invention is to provide a method of making an intermediate transfer member with a seamed substrate layer that does not adversely affect the image being transferred to or from its surface in the region of the seam. This improved intermediate transfer member allows for a uniform, uninterrupted first electrostatic transfer of a toner image from a primary imaging device and a second electrostatic transfer from intermediate transfer member to a receiver utilizing the whole transfer member including the seamed area. This improved intermediate transfer member also allows for enhanced machine productivity over a wide range of receiver sizes due to the ability to utilize the whole transfer member including the seamed area.

SUMMARY OF THE INVENTION

The present invention is a process for making an intermediate transfer member. The process includes forming an endless belt by seaming two ends of a substrate material to form a seam. A smoothing layer is applied on top of the endless belt using a rotary cast process wherein said intermediate transfer member has a continuous seamless top surface. In a preferred embodiment the endless belt is formed by adhering at least two layers of a substrate to form a belt having an inner and outer seam.

BRIEF DESCRIPTION OF THE DRAWINGS

FIG. 1(*b*) is a schematic perspective view, not to scale, of a diagonal, butt-seamed and taped, substrate in the form of a cylindrical belt where the seam is viewed from the outside. The spacing between ends of the substrate is exaggerated for clarity.

Figure 1A:
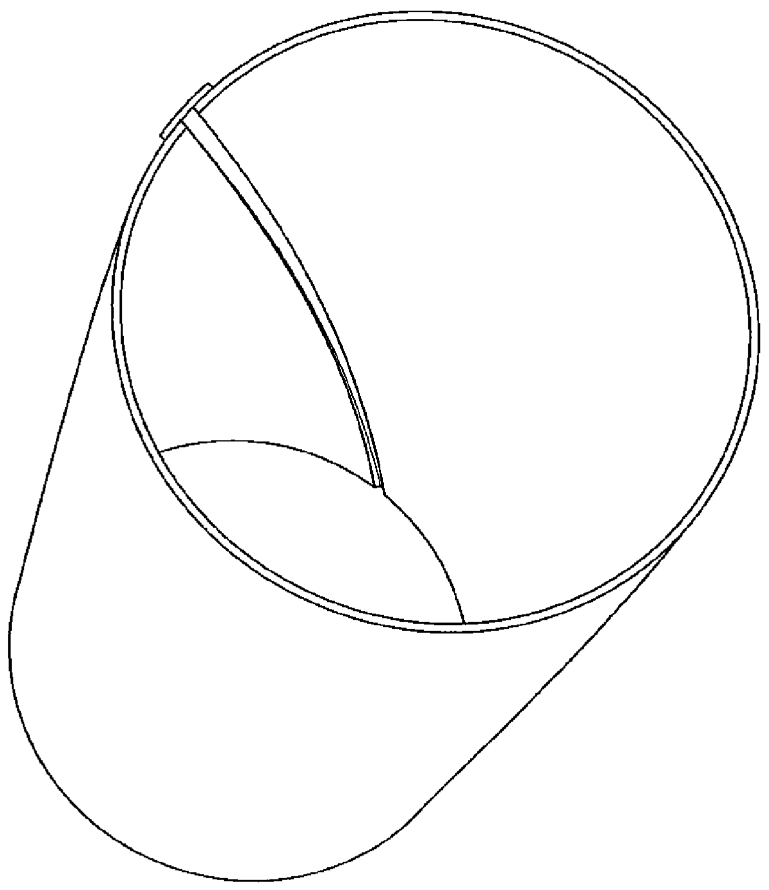
FIG. 1(*a*) is a schematic perspective view, not to scale, of a diagonal, butt-seamed and taped substrate in the form of a cylindrical belt where the seam is viewed from the inside. The spacing between ends of the substrate is exaggerated for clarity.

For better understanding of the present invention, together with other advantages and capabilities thereof, reference is made to the following detailed description in connection with the above-described drawings.

DETAILED DESCRIPTION OF THE INVENTION

The object of the present invention is a process for making a low cost, multilayer, intermediate transfer member (ITM)

for use in an electrostatographic machine. The process of this invention produces a multilayer ITM that has a continuous seamless top surface formed on a seamed substrate. Applying a smoothing layer of specified thickness on top of the seamed substrate allows it to be used in an electrostatographic machine as if it were seamless.

The process of the present invention for making an intermediate transfer member for use in an electrostatographic machine includes the following steps: 1) forming an endless belt by seaming two ends of a substrate material; 2) applying a smoothing layer on top of the endless belt so that it forms a continuous layer across the surface of the belt such that the belt thickness far from the seam is equal to the belt thickness at the seam without any need for a finishing step; 3) applying a release layer on top of the smoothing layer; wherein the top surface of the intermediate transfer member above the region of the seamed substrate has a roughness approximately equal to the roughness in regions where the seam is not present. The method of making the intermediate transfer member can be utilized in making intermediate sleeves, endless intermediate belts, or intermediate drums.

The first step in making the ITM is to seam two ends of a substrate material. The substrate layer acts as a supporting layer for subsequent functional layers. The substrate material may be of any of a variety of flexible materials such as a fluorinated copolymer (such as polyvinylidene fluoride), polycarbonate, polyurethane, polyethylene terephthalate, polyimides (such as Kapton™), polyethylene napthalate, or silicone rubber. For some applications the substrate can also comprise a metal such as nickel, aluminum, or steel. When non-metals are used the substrate material may contain an additive, such as an anti-stat (e.g. metal salts), conductive polymers (e.g. polyaniline or polythiophene), conductive metal oxides (e.g. tin oxide) or small conductive particles (e.g. carbon), to impart the desired conductivity. The preferred support layer is a polymeric material such as polyester, polycarbonate, or polyamide but the specifics of the substrate will vary depending on the application. Preferably, the substrate is conductive or semi-conductive either along its surface and/or through its bulk. Suitable materials for use as surface conductive layers include, but are not limited to, vapor deposited aluminum, nickel, or indium tin oxide, or solution coated polythiophene, tin oxide, carbon black, carbon nanotubes, or polyaniline.

Fibrous material may be used to reinforce the substrate layer. A reinforcing member of fibrous material can be prepared by weaving fibrous material into a mat or sheet as practiced in the art or the fibrous material may be held together in non-woven form with or without a bonding agent as practiced in the art.

The optimum thickness of the substrate will depend on the specific application and can range between 10 and 400 micrometers with a preferred thickness between 50 and 175 micrometers.

The ends of the support layer are brought together and seamed to create a continuous loop. While a variety of methods could be used to form the seam, an appropriate method must be chosen such that a smoothing layer coated on its surface can effectively hide the seam. The seam must also stay functional following the manufacturing processes of subsequent layers, e.g. thermal curing and polishing.

A preferred seam is in a configuration other than a straight line that is perpendicular to edge of the seamed member and also to the process direction of movement of the belt in an electrostatographic machine. The benefits associated with forming the seam on an angle other that 90 degrees is increased mechanical strength of the ITM, improved flexibility of the seam when the belt is wrapped on rollers and reduced perception of image artifacts. Forming the seam of the belt at a diagonal with respect to its length or direction of its intended movement allows for a longer interface at which to join the ends of the material. The longer interface allows for a stronger seam. A 45 degree angled seam increases the seam strength by 41% relative to a 90 degree seam; i.e., one which is perpendicular to the edge of the member. The angle of the seam can range from about 20 degrees to about 60 degrees and is preferably about 45 degrees relative to the lengthwise dimension direction of the belt. The angled seam also minimizes the effect of stiffness change due to the seam on uniform flexibility of the belt by distributing the stiffness change over a greater length of the belt. Perturbations in the imaging system due to the seam passing by or over components in an imaging system are therefore reduced. The geometry to which the two ends are cut could include straight, chevron, or finger joints, also known as a puzzle cut seam. Other seaming approaches could also be used such as a lap seam with square or beveled ends. The optimum type of seam is based on the cost to manufacture, the specific application of the ITM, the materials chosen, and the mechanical properties desired. U.S. Pat. No. 6,016,415 discloses imaging improvements and other details and benefits associated with seams that are not perpendicular to the edge of an electrostatographic member.

Figure 1B:
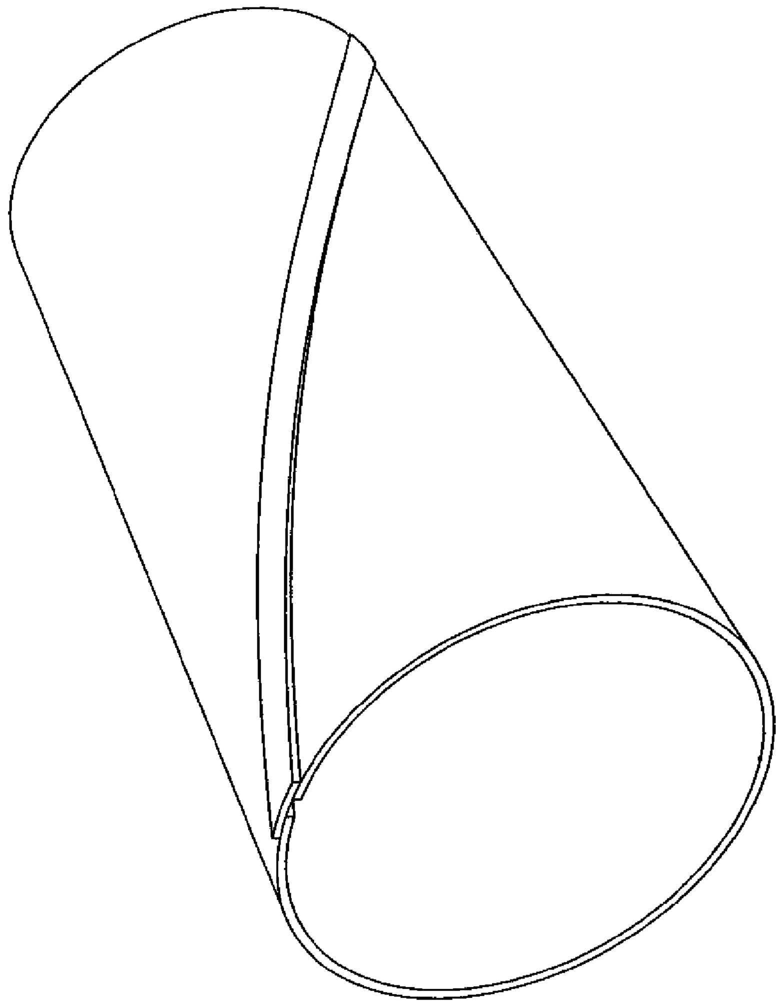

A schematic of a substrate with a taped butt seam is shown in FIG. 1(*a*) and FIG. 1(*b*). A butt seam is a well-known, low cost method for seaming. A belt with a well-controlled circumference can be made with a butt seam by wrapping the support material around a device with a known diameter, such as a mandrel. Vacuum can be used to hold the support material in place. The support material is overlapped in an area on the mandrel where a cutting groove exists and is then cut with a sharp tool. A preferred seam is cut at an angle other than perpendicular to the ends of the sheet. To make such a cut, the cutting groove must be at a diagonal, and will appear as a helical or spiral cut on a cylindrical splicing mandrel. An alternative method to cut the substrate to the precise dimension is to use a die. Die-cutting is preferred for some types of cuts, such as finger joints.

The preferred low cost method of bonding the seam together is a tape splice. The tape should meet the requirements of subsequent manufacturing processes as well as the electrical and mechanical specifications of the printing apparatus. A preferred tape material is polyester. Another preferred tape material would be made from the same material as the substrate material by applying an adhesive coating to one of its surfaces. In either case the adhesive properties of the tape should be such that the tape adequately adheres to the support material. The width of the tape material should cover the seam and could range from 4 mm to 30 mm, with a preferred width of 6 to 15 mm. The thickness of the tape could range from 0.012 to 0.075 mm with a preferred with of 0.025 to 0.050 mm.

Suitable materials for adhesive include, but are not limited to, hot melt adhesives such as polyamides, urethanes, or polyesters, or UV-curable adhesives such as acrylic epoxies, polyvinyl butyrals, or the like. Electrical conductivity may be imparted to the adhesive by incorporating a conductive component such as silver, indium tin oxide, cuprous iodide, tin oxide, 7,7',8,8'-tetracyanoquinonedimethane (TCNQ), quinoline, carbon black, NiO and/or ionic complexes such as quaternary ammonium salts, metal oxides, graphite, or like conductive fillers in particulate, flake or fiber form and conductive polymers such as polyaniline and polythiophenes.

Once the substrate ends are bonded together any applied vacuum may be removed from the mounting device to allow removal of the seamed continuous loop of support material. Other suitable means for joining the ends of intermediate transfer substrate include, but are not limited to, adhesive bonding, adhesive tape, welding, mechanical interlocking, sewing, wiring, or stapling. A thermal or ultrasonically welded lap joint has a preferred overlap range of 1 to 6 mm. This amount of overlap is substantially uniform across the seam and is formed by cutting both ends of the belt material at an appropriate angle and positioning the ends so that one end lies on top of the other end. Regardless of the seaming method it is preferred that the seam remain flexible.

For some applications it may be desired to use post-finishing steps prior to coating the smoothing layer to smooth the seam area of the substrate and to reduce the step height at the seam, i.e., by grinding and polishing. The entirety of the belt may also be ground to a uniform surface roughness.

Figure 2:
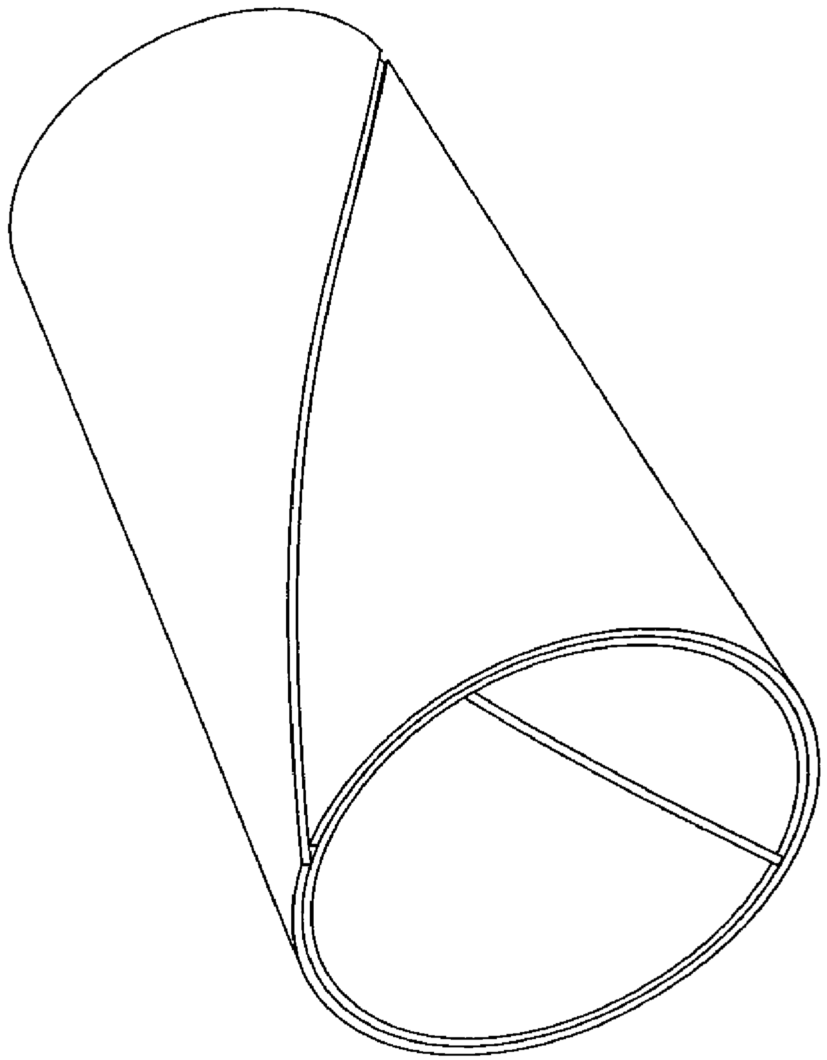
FIG. 2 is a schematic perspective, not to scale, of a double wrap substrate having two diagonal butt splice seams.

An alternate method of forming a seamed substrate utilizes two sheets of substrate material on top of each other bonded together to form an endless loop as shown in FIG. 2. A preferred angled seam is shown in FIG. 2 but other seam geometries as mentioned above could also be used. The preferred substrate material is a polymeric material such as polyester or polyamide but other materials as described above could also be used. The methods and materials described above may also be used for imparting the desired electrical properties to the substrate. A thin conductive coating may be used on one or both sides of each sheet if the substrate material is insulating. In the case of the single sided conductive coating, the two substrates are laminated together with the conductive coatings on the opposing sides. The ends of the two sheets form two butt seams, one seam on the inside of the member and one seam on the outside as shown in FIG. 2. The two substrates are laminated together, with their respective seams preferably non-overlapping, to minimize the effect of the seams on the mechanical performance of the ITM, having a diagonal seam oriented at 20 to 60 degrees is preferred. The two substrate sheets are preferably adhered together using an adhesive resistant to the heat and chemicals used in subsequent steps in the process of making the ITM. The most preferred substrate material in this embodiment is a 50 to 125 micrometer thick polyester sheet manufactured with a conductive coating such as aluminum on one side of the sheet and a temperature resistant adhesive on the opposite side of the sheet.

In any of the embodiments that comprise conducting coatings on an insulating substrate it may be desired to make an electrical connection between the inside (bottom) conducting surface and the outside (top) conducting surface. Specific approaches, their use and importance to ensuring electrical continuity from one surface of the substrate to another surface of the substrate when the bulk of the substrate is insulating, are contained in the accompanying disclosure Ser. No. 2008/0028566 and are incorporated herein by reference. For example, an electrical connection could be made with conductive tape or with the addition of a hole filled with a conductive filler containing carbon or silver.

Additional seaming methods are known by those skilled in the art and are envisioned as alternative methods for forming the endless loop that acts as the substrate for the ITM.

A smoothing layer is formed on top of the seamed substrate so that it forms a continuous layer across the surface of the belt. The smoothing layer thickness is specified to be thick enough to hide the mechanical and electrical discontinuities of the seamed substrate. The smoothing layer thickness will vary depending on the specific application of the ITM but will typically range from 0.03 mm to 5 mm and is preferably 0.08 mm to 0.8 mm. The smoothing layer is preferred to be a compliant elastomeric material such as polyurethanes, neoprenes, silicones, fluoropolymers, silicone-fluoropolymer hybrids, nitrites, or silicon-nitriles.

The preferred material for the smoothing layer is an elastomer that is compliant, preferably a polyurethane elastomer, the elastomer being doped with sufficient conductive material (such as antistatic particles, ionic conducting materials, or electrically conducting dopants) to have a relatively low bulk or volume electrical resistivity, which resistivity is preferably in a range of approximately $10^7$ to $10^{11}$ ohm-cm, and more preferably about $10^9$ ohm-cm. A preferred smoothing layer has a Young's modulus less than 50 MPa, more preferably in a range of approximately 2-10 MPa.

The method used to form the smoothing layer is an important aspect of the invention. A smooth continuous top surface precludes the need for a finishing step that is typically needed to achieve dimensional tolerances. Such finishing steps are expensive and require long periods of conditioning when precision tolerances are specified.

The method of applying the smoothing layer utilizes a rotary cast process, such as ribbon coating, spray coating, transfer coating, or gravure coating. The preferred method of casting is ribbon casting as described in detail below. A smoothing layer made by the rotary cast method can effectively mask the mechanical discontinuity of the seamed substrate and yield an intermediate transfer member with exceptional dimensional tolerances, thus eliminating the need for grinding to a final thickness. The roughness of the ITM in the region of the seamed substrate can be produced so that it is similar to the roughness in other functional areas of the ITM.

Using the methods described in this invention, the rotary cast device can produce an ITM having a volume resistance in the region of the seamed substrate approximately equal to the volume resistance in regions where the seam is not present. The ITM can also be made so that the surface resistance above the region of the seamed substrate is approximately equal to the surface resistance in regions where the seam is not present.

This rotary cast method of applying the compliant layer requires a coating apparatus with a well-controlled solution delivery device. The coating apparatus includes a rotational device such as a lathe and well-controlled linear movement device such as found on some metal or woodworking lathes.

A preferred solution delivery method is to use a mix and metering device capable of accurately controlling the rate of flow and also capable of degassing the material to be coated. An alternative solution delivery system would use a variable speed pump to draw coating material from a material reservoir into the coating head and onto a substrate. A suitable control device to control the solution delivery flow rates can compensate for changes in any variable that affects the coated thickness and uniformity, such as temperature, viscosity, and speed.

Figure 3:
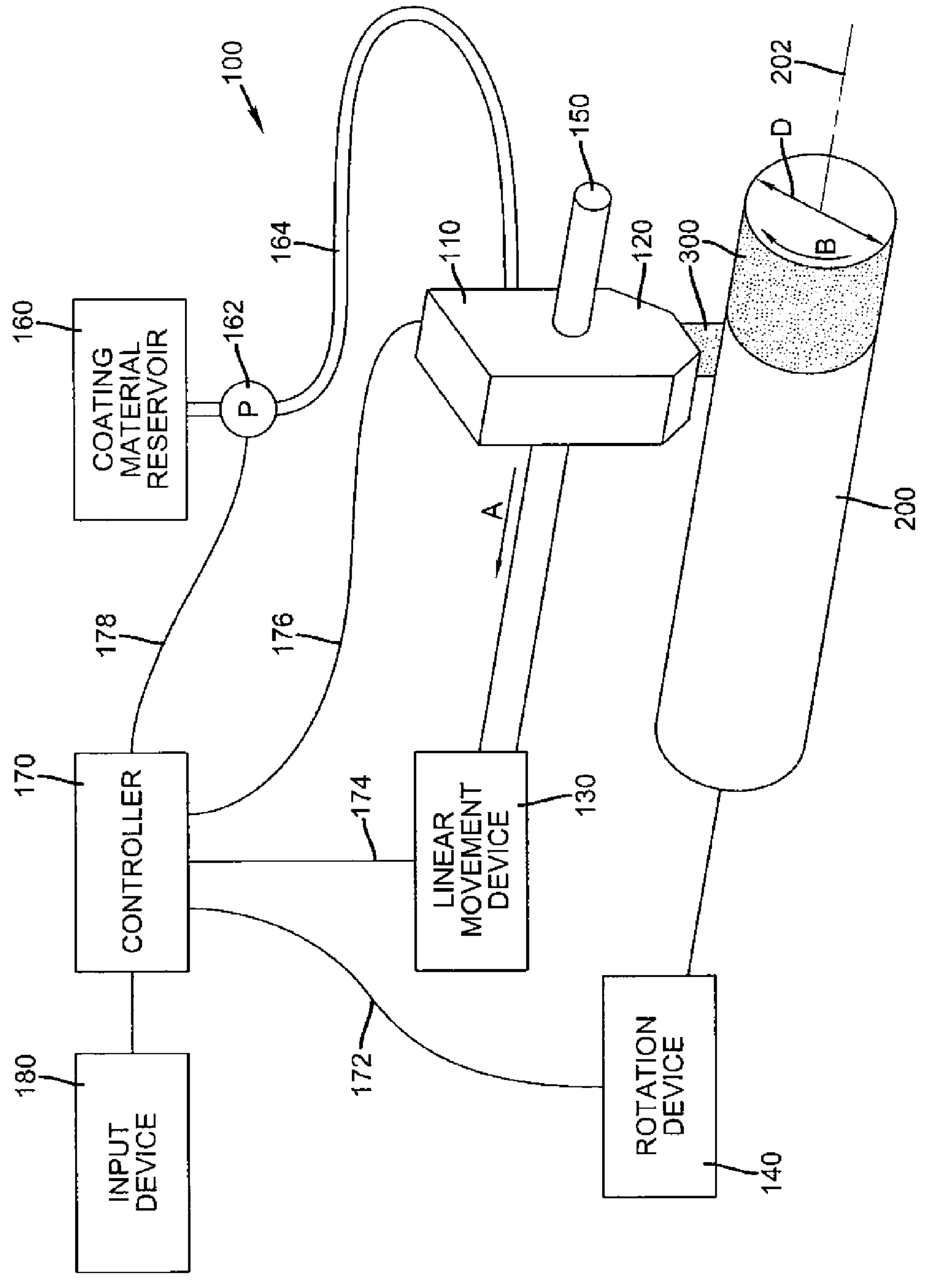
FIG. 3 is a schematic of a rotary casting system for coating an elastomeric layer onto a substrate.

A schematic of a typical rotary cast apparatus is shown in FIG. 3. The support layer or substrate material is mounted on the cylindrical mandrel (200), which is held horizontally on a rotational device (not shown) such as a lathe. Alternatively, the cylindrical mandrel could be replaced with two or more rollers to hold the support substrate in tension during the application of the smoothing layer. The speed at which the horizontally mounted mandrel rotates can be well maintained using a controller 170 or a computer with the proper programming software such as Labview™. The solution delivery system could include a variable speed pump 162 that draws the material from the solution pot at a well-controlled flow rate and onto the substrate 200. The variable speed pump could be replaced with a mix and metering solution delivery device. A mix and metering device allows one to mix, meter, control viscosity, monitor temperature, and degas the compliant layer materials as they come out of the mix head onto the substrate. A metering delivery device typically uses a controller to control the flow rate and volume mix ratio for precise materials delivery and desired materials characteristics.

The variable pump delivery or the mix and metering delivery device would be connected to a linear movement device (130). Rubber or metal lined tubing 164 could be used to connect the pump to the lateral moving device. The width of the compliant layer ribbon delivered onto the substrate mounted mandrel can be controlled by using different width nozzles (120) in both the variable pump speed delivery device as well as the mix metering device. The nozzles could incorporate stationary or static mixers for additional mixing. Also, a variety of different nozzle configurations are possible, such as tapered, round, and ribbon depending on the specific application. Nozzle size diameters range from 0.075 mm to 40 mm.

Preferably, an in-line viscometer and temperature sensor is used to monitor the smoothing layer materials during the coating process.

The method of applying the smoothing layer comprises several steps. The rotation device 140 rotates the substrate to be coated about a rotation axis 202, in the direction shown by arrow B. A nozzle 120 is attached to the coating device 110. A pump 162 pumps coating material 300 from the coating material reservoir 160 through tubing 164. The coating material 300 then flows through the coating device 110 to the nozzle 120 and is dispensed onto the substrate 200 while the rotation device 140 rotates the mandrel 200 and the linear movement device 130 moves the coating device 110 in the direction shown by arrow A. It is preferable that the nozzle 120 is removable so that it can be cleaned or replaced with another nozzle.

A controller 170 is connected to one or more elements in apparatus to control various aspects of their operations. FIG. 3 shows the controller connected to the to the rotation device 140 by a link 172, to the linear movement device 130 by a link 174, to the coating device 110 by a link 176 and to the pump 162 by a link 178. The controller 170 can control driving of the substrate 200 by the rotation device 140, and can control movement of the coating device 110 by the linear movement device 130. Various control data may be input to the controller 170 via an input device 180. The controller 170 may follow instructions of a program created in ways that are known by those skilled in the art. Also known in the art are means to interact with the operator of the apparatus by using a type of message output device such as a monitor or the like (not shown) connected to the controller 170 to prompt and confirm user input, and to output any relevant messages before, during or after processing (e.g., "coating finished", etc.). Also, the controller 170 may detect various conditions, such as "coating material reservoir needs to be filled" and/or the like, and appropriately inform the operator via the message output device.

The quality and processing time associated with the smoothing layer material can be optimized with additives to the smoothing layer material that improve the rotary cast process. For example, a catalyst could help to control the reaction rate of the material, aiding in flow and the healing process of each individual ribbon so that a smooth uniform surface is achieved. Example catalysts could include metal based catalysts such as DABCO K-15, DABCO T-120, or DABCO T12N. Other examples of catalysts would include the amine containing catalysts such as DABCO 33-LV, DABCO TMR and Curithane 52. Controlling the temperature of the coating material can also improve its uniformity.

A release layer can be applied, if needed, as a top layer subsequent to the formation of the smoothing layer also using techniques that produce no noticeable seam at the outer surface. A top release layer is preferred and is used to further improve overall performance and life of the ITM. The preferred method of applying a uniform top release layer is ring coating. The ITM is mounted onto a rigid mandrel or between two end caps for support. The mounted ITM is centered vertically within a coating gasket such that the coating gasket has some interference with the outside of the ITM. The interference between the coating gasket and the ITM forms a coating solution well for holding the release layer material. An operator fills the solution well and allows the ITM to travel vertically up through the gasket resulting in a uniform coating. The coating thickness and uniformity are controlled by adjusting the viscosity of the coating solution as well as the vertical speed at which the ITM is drawn up through the coating gasket. Although ring coating is the preferred method for application of a release layer, one could use alternative methods such as spray coating, dip coating, rotary casting, gravure coating and transfer coating. All of the above manufacturing methods are suitable for providing a release layer that is uniform and consistent.

The release layer is an integral, uniform coating or outerskin of a material such as a thermoplastic, silicone, polyurethane, sol-gel, ceramer, or a fluorinated material such as PTFE, but other materials having good release properties including low surface energy materials may also be used. Alternatively, the coating can also be comprised of fine particles spaced closely enough together so as to substantially cover the surface of the smoothing layer. The release layer thickness is preferred to be between 1 and 20 micrometers but will vary depending on the application.

The ITM may include indicia such as a bar code or an RFID device. The indicia may be placed on the surface of the substrate prior to coating the smoothing layer, the surface of the smoothing layer or on top of the release layer. The details of the indicia have previously been disclosed in U.S. Pat. No. 6,377,772 and are hereby incorporated by reference.

EXAMPLES

Example 1

The above-described coating apparatus as shown in FIG. 3 has been successfully used to coat a seamed substrate with a circumference of 569 mm and a length of 360 mm to make an intermediate transfer member with a dimensionally uniform, compliant, smoothing layer. A static dissipative polyimide sheet 85 micrometers thick was used as the substrate. Prior to coating the substrate it was first spliced to form a cylindrical shape. The substrate material was wrapped around a well-defined, cylindrical, splicing mandrel and vacuum was applied to holes in the splicing mandrel to hold the substrate tight to the mandrel surface. The splicing mandrel provided a well controlled inside diameter of the resulting seamed substrate. The ends of the substrate were overlapped and a sharp cutting tool was used to cut down its length so that the ends of the sheet were accurately aligned. The excess scrap material was removed and 0.05 mm thick polyester tape was applied to adhere the two ends of the sheet to form a taped butt seam perpendicular to the edges of the seamed substrate.

The seamed substrate material was then air-mounted on a well-defined, cylindrical, coating mandrel with approximately 0.025 mm of interference between the inside diameter of the seamed substrate and the outside diameter of the coating mandrel. The air mounting was accomplished by forming an air bearing between the coating mandrel and the substrate by applying pressurized air to holes surrounding one end of the coating mandrel's surface. The air bearing expanded the substrate so that it could be easily mounted on the mandrel in the appropriate location. The air was then removed so that the initial small amount of interference between substrate and mandrel prevented the substrate material from moving during application of the smoothing layer and also prevented any of the smoothing layer material from seeping between the substrate and mandrel.

Polyurethane doped with a metal salt antistatic material was used for the smoothing layer material. The polyurethane material comprised 1) a diisocyanate-terminated prepolymer, obtained from Uniroyal Chemical Company; 2) a diol-terminated prepolymer obtained from Sigma Aldrich; 3) an antistat material from Eastman Kodak Company; and 4) an ethoxylated trimethylolpropane obtained from Perstorp Polyols Inc. The temperature of the polyurethane material components was controlled to improve the uniformity of the smoothing layer. The polyurethane material was pre-mixed in a well-controlled mix metering device and delivered into a beaker that served as the coating reservoir. A variable speed pump was used to transfer the polyurethane material from the reservoir to the metering head and also to control the speed at which it was delivered onto the substrate. A 5 mm wide metering head nozzle was used. Control of the flow rate at which the smoothing layer solution was delivered, coupled with control of both the rotational speed of the coating mandrel and the translation speed of the linear movement device, allowed precise control of the smoothing layer thickness. Monitoring the rheology of the smoothing layer material as it was being delivered onto the substrate aided in the delivery and healing of each individual ribbon into its neighboring ribbon.

After the smoothing layer material was applied the mandrel remained rotating for a period of one hour, allowing the centrifugal forces of the rotating mandrel to aid in additional leveling of the smoothing layer and to partially cure the material. The substrate with the smoothing layer was then placed in an oven for 16 hours at 100° C. to fully cure the material.

After full cure, the part was removed from the oven and measured dimensionally for smoothing layer uniformity. A zero degree mark was placed on one end of the intermediate transfer member allowing the ITM to be broken down into four different quadrants. Smoothing layer wall thickness measurements were taken at one-inch lengths in each of the four quadrants, totaling fifty-two measurements in all, using a large pair of calibrated calipers. The thickness of the ITM was measured to be 0.625 mm thick and was both uniform and smooth. The cylindrical run-out calculated from the measured data was 8 micrometers in the functional portion of the part, thus no finishing step was needed to achieve the specified tolerances.

Next, a release layer was applied. The material of the release layer was a sol-gel ceramer as described in U.S. Pat. No. 5,968,656. The sol-gel ceramer material was applied with a ring coating method to achieve a thickness of 6.0±1 micrometers. After application of the release layer, the ITM was placed into an oven for 24 hours at 80° C. to fully cure the release layer.

The average roughness of the ITM surface in the area of the seam was approximately equal to the roughness of other areas of the ITM. The average roughness was measured both inside and outside the seamed area and in both areas the average roughness was found to be 0.07 micrometers. The maximum height of profile and the average profile peak height was also approximately equal in areas both above the seam and away from the seam: 0.54 micrometers and 0.36 micrometers, respectively.

Example 2

The same manufacturing process as described in Example 1 was utilized and the same materials were used for the smoothing and release layers. Example 2 differs from Example 1 in that the substrate used was a 100 μm thick insulating polyester material, seamed in the same manner and configuration as described in Example 1. After application and curing of the smoothing layer the thickness of the ITM was measured to be 0.625 mm thick and was both uniform and smooth. The cylindrical run-out calculated from the measured data was 8 micrometers in the functional portion of the part, thus no finishing step was needed to achieve the specified tolerances. After application and curing of the release layer, the average roughness was measured both inside and outside the seamed area and in both areas the average roughness was found to be 0.07 micrometers. The maximum height of profile and the average profile peak height was also approximately equal in areas both above the seam and away from the seam: 0.54 micrometers and 0.36 micrometers, respectively.

Example 3

The same materials and manufacturing process as described in Example 2 were utilized. Example 3 differs from Example 2 in that the substrate, a 100 μm thick insulating polyester material, had a nickel metallization layer on one surface, providing a surface resistivity of 5 log ohm/square. The smoothing and release layers were coated on top of this conductive surface. After application and curing of the smoothing layer the thickness of the ITM was measured to be 0.653 mm thick and was both uniform and smooth. The cylindrical run-out calculated from the measured data was 5 micrometers in the functional portion of the part, thus no finishing step was needed to achieve the specified tolerances. After application and curing of the release layer, the average roughness was measured both inside and outside the seamed area and in both areas the average roughness was found to be 0.06 micrometers. The maximum height of profile and the average profile peak height was also approximately equal in areas both above the seam and away from the seam: 0.24 micrometers and 0.36 micrometers, respectively.

Comparative Example 1

The same substrate material (static dissipative polyimide sheet 85 μm thick) and substrate seaming process was utilized as described in Example 1. Comparative Example 1 differs from Example 1 in that no smoothing layer was applied. Instead, a ceramer release layer, as described in Example 1, was coated directly on top of the seamed substrate.

Figure 4:
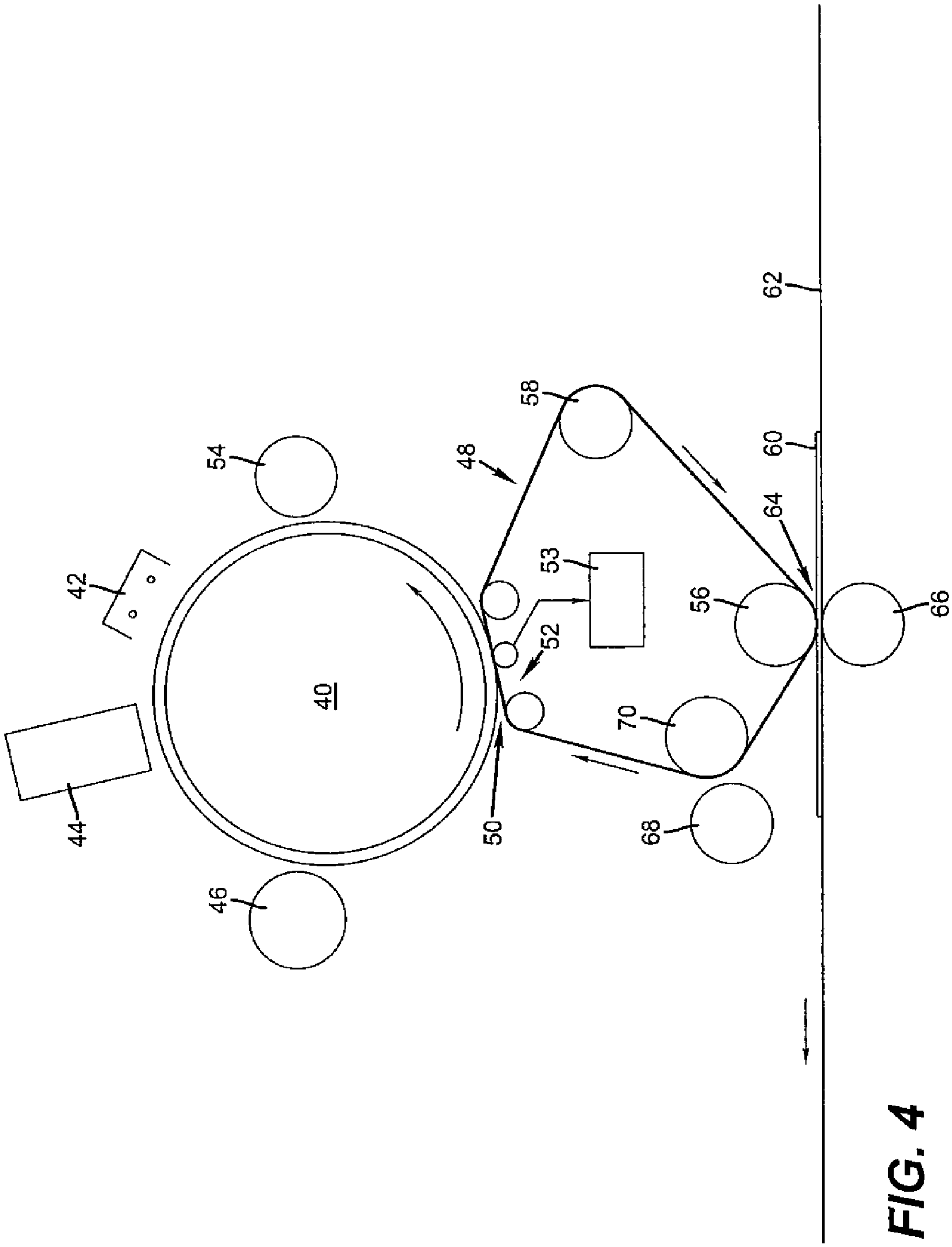
FIG. 4 is a schematic of an electrophotographic apparatus for testing ITMs used as an endless belt.

The ITMs described in Examples 1 to 3 and Comparative Example 1 were tested as endless belt members in the electrophotographic apparatus shown in FIG. 4, operating at a process speed of 300 mm/sec. A primary image-forming member (PIFM) in the form of a tube 40 has a photoconductive surface upon which a pigmented marking particle image is formed as the PIFM rotates about its respective rotational axis shown as shown by the arrow in FIG. 4. In order to form an image, the outer surface of the PIFM is first uniformly charged by a corona charging device 42. Then the uniformly charged surface is exposed by an LED 44 to selectively alter the charge on the surface of the PIFM 40, creating an electrostatic image corresponding to an image to be reproduced. Note that the electrostatic image creation process occurs independent of the location of the seam in ITM 48. This allows evaluation of image quality both on the seam as well as away from the seam. The electrostatic image is developed by application of pigmented marking particles to the latent image bearing photoconductive tube 40 by development station 46. The marking particle image on the photoconductive tube 40 is then electrostatically transferred to the outer surface of the ITM 48 at transfer nip 50, formed by the engagement of transfer backup roller 52 and photoconductive tube 40. Roller 52 is electrically biased using high voltage power supply 53. Subsequently, photoconductive tube 40 is cleaned of any residual toner image by cleaner 54 to prepare the surface for reuse.

ITM 48 is conveyed in a clockwise fashion by driven roller 56 around steering roller 58 which also provides tension to ITM 48. The marking particle image residing on the outer surface of ITM 48 is now electrostatically transferred to receiver member 60 at transfer nip 64, formed by the engagement of backup roller 66 and drive roller 56. Receiver member 60 has been previously electrostatically tacked to transport web 62 (not shown). Subsequently, receiver member 60 is transported by a transport mechanism to a fuser where the marking particle image is fixed to receiver member 60 by the application of heat and pressure (also not shown). In addition, ITM 48 is transported to cleaner 68 to remove any residual toner image and prepare the surface for reuse.

As shown in Table 1 the ITM belts described in Examples 1, 2, and 3 exhibited good image quality even on the seam. In contrast, the ITM belt described in comparative example 1 had significant degradation in image quality at the seam.

TABLE 1

| Example | Substrate | Coating | Seam Image Quality |
|---|---|---|---|
| 1 | Carbon loaded polyimide | Polyurethane and creamer | + |
| 2 | Insulating polyester | Polyurethane and creamer | + |
| 3 | Insulating polyester with surface metallization | Polyurethane and creamer | + |
| Comparative 1 | Carbon loaded polyimide | None | − |

+: no seam discernable in image on receiver
−: seam artifact visible in image on receiver The invention has been described in detail with particular reference to certain preferred embodiments thereof, but it will be understood that variations and modifications can be effected within the spirit and scope of the invention.

It is claimed:

1. A process for making an intermediate transfer member comprising:

forming an endless belt by seaming two ends of a substrate material comprising polyester, polycarbonate, or polyamide to form a seamed substrate; and applying a seamless smoothing layer comprising a compliant elastomeric material and having a Young's modulus of less than 50 MPa directly on top of the seamed substrate using a rotary ribbon casting process, and applying a release layer on top of the smoothing layer, wherein said intermediate transfer member has a continuous seamless top surface.

2. The process of claim 1 wherein a thickness of the member far from the seam is approximately equal to a thickness of the member at the seam.

3. The process of claim 1 wherein a top surface of the intermediate transfer member above the seam has a roughness approximately equal to a roughness above a region far from the seam.

4. The process of claim 1 wherein a top surface of the intermediate transfer member above the seam has a surface resistance approximately equal to a surface resistance above a region far from the seam.

5. The process of claim 1 wherein a volume resistance in a region of the seam is approximately equal to a volume resistance in a region far from the seam.

6. The process of claim 1 wherein the seaming is performed by taping.

7. The process of claim 1 wherein the seaming is performed by ultrasonically welding.

8. The process of claim 1 wherein the seaming is performed by mechanical interlocking.

9. The process of claim 1 wherein the seaming is performed by applying adhesive to the seam.

10. The process of claim 1 wherein the seam is perpendicular to an edge of the member.

11. The process of claim 1 wherein the seam is at an angle other than perpendicular to an edge of the member.

12. The process of claim 1 wherein the smoothing layer comprises polyurethane.

13. The process of claim 1 wherein the smoothing layer comprises a thickness of from 0.03 mm to 5 mm.

14. The process of claim 1 wherein an indicia is placed on the intermediate transfer member.

15. A process for making an intermediate transfer member comprising:

forming an endless belt by adhering at least two layers of a substrate material, each of the layers of substrate material comprising polyester or polyamide, to form a belt having an inner and outer seam; and applying a seamless smoothing layer comprising a compliant elastomeric material and having a Young's modulus of less than 50 MPa on top of the endless belt using a rotary ribbon casting process, and applying a release layer on top of the smoothing layer, wherein said intermediate transfer member has a continuous seamless top surface.

16. The process of claim 15 wherein the inner seam and outer seam are not aligned.

17. The process of claim 15 further comprising adhesive interposed between the two layers of the substrate.

18. The process of claim 15 wherein a thickness of the member far from the outer seam is equal to a thickness of the member at the outer seam.

19. The process of claim 15 wherein a top surface of the intermediate transfer member above the outer seam has a surface resistance approximately equal to a surface resistance above a region far from the outer seam.

20. The process of claim 15 wherein a volume resistance in a region of the outer seam is approximately equal to a volume resistance in a region far from the outer seam.

21. The process of claim 15 wherein the smoothing layer comprises polyurethane.

22. The process of claim 15 wherein the smoothing layer comprises a thickness of from 0.03 mm to 5 mm.

23. The process of claim 15 wherein an indicia is placed on the intermediate transfer member.

* * * * *